United States Patent
Bao et al.

(10) Patent No.: US 6,788,687 B2
(45) Date of Patent: Sep. 7, 2004

(54) METHOD AND APPARATUS FOR SCHEDULING PACKET DATA TRANSMISSIONS IN A WIRELESS COMMUNICATION SYSTEM

(75) Inventors: Gang Bao, San Diego, CA (US); David Puig Oses, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 337 days.

(21) Appl. No.: 10/001,610

(22) Filed: Oct. 30, 2001

(65) Prior Publication Data

US 2003/0081627 A1 May 1, 2003

(51) Int. Cl.[7] .......................... H04L 12/50; H04Q 11/00
(52) U.S. Cl. ...................... 370/394; 370/349; 370/329; 370/444
(58) Field of Search .................... 370/328, 338, 370/349, 335, 342, 389, 394, 412, 428, 429, 431, 329, 391, 441, 465, 474, 444

(56) References Cited

U.S. PATENT DOCUMENTS

| | | | | |
|---|---|---|---|---|
| 4,763,322 A | * | 8/1988 | Eizenhofer | 370/337 |
| 5,101,501 A | | 3/1992 | Gilhousen et al. | |
| 5,442,625 A | * | 8/1995 | Gitlin et al. | 370/342 |
| 5,619,492 A | * | 4/1997 | Press et al. | 370/441 |
| 5,648,955 A | * | 7/1997 | Jensen et al. | 370/252 |
| 5,729,534 A | * | 3/1998 | Jokinen et al. | 370/280 |
| 5,734,646 A | * | 3/1998 | I et al. | 370/335 |
| 5,914,950 A | | 6/1999 | Tiedemann, Jr. et al. | |

FOREIGN PATENT DOCUMENTS

| | | |
|---|---|---|
| EP | 0917317 A1 | 5/1999 |
| WO | WO 98/42108 | 9/1998 |
| WO | WO 01/63851 A1 | 8/2001 |

OTHER PUBLICATIONS

Andrews, et al. "Providing Quality of Service Over a Shared Wireless Link" IEEE Communications Magazine 39(2): 150–154 (Feb. 2001).

Joshi, et al. "Downlink Scheduling in CDMA Data Networks" ACM Mobicom 2000, 12 pgs.

Bender, et al. "Flow and Stretch Metrics for Scheduling Continuous Job Streams" In Proc IX Ann. ACM–SIAN Symp. Discrete Algorithms, pp. 270–279, San Francisco, CA (Jan. 1998).

Shakkottai et al. "Scheduling Algorithms for a Mixture of Real–Time and Non–Real–Time Data in HDR," Mathematical Sciences Research Center, Bell Laboratories, Lucent Technologies, Murray Hill, NJ.

Shakkottai et al. "Scheduling for Multiple Flows Sharing a Time–Varying Channel: The Exponential Rule," Bell Labs, Coordinated Scuence Laboratory, University of Illinois; Lucent Technologies, Murray Hill, NJ 07974, Dec. 23, 2000.

* cited by examiner

*Primary Examiner*—Ajit Patel
(74) *Attorney, Agent, or Firm*—Philip Wadsworth; Sandra L. Godsey

(57) ABSTRACT

A method for scheduling packet data transmissions in a wireless communication system wherein a per-user Priority Function (PF) is calculated based on the channel condition and throughput for each user. In one embodiment, the system supports retransmission of data packets and subpackets, wherein the retransmission information is used to schedule data transmissions. In another embodiment, at each time interval the system updates the priority factor for the user having the highest priority factor in the previous time interval. The priority factors of the other users remain unchanged.

11 Claims, 11 Drawing Sheets

METHOD AND APPARATUS FOR SCHEDULING PACKET DATA TRANSMISSIONS IN A WIRELESS COMMUNICATION SYSTEM

REFERENCE TO CO-PENDING APPLICATIONS FOR PATENT

The present application for patent is related to:

"METHOD AND APPARATUS FOR SCHEDULING PACKET DATA TRANSMISSIONS IN A WIRELESS COMMUNICATION SYSTEM" by Jack Holtzman et al., having application Ser. No. 09/929,179, filed Aug. 14, 2001, assigned to the assignee hereof and hereby expressly incorporated by reference herein; and "METHOD AND APPARATUS FOR SCHEDULING PACKET DATA TRANSMISSIONS IN A WIRELESS COMMUNICATION SYSTEM" by Leonid Razoumov et al., having application Ser. No. 09/728,239, filed Nov. 30, 2000, assigned to the assignee hereof and hereby expressly incorporated by reference herein.

FIELD

The present invention relates to wireless data communication. More particularly, the present invention relates to a novel and improved method and apparatus for scheduling packet data transmissions in a wireless communication system.

BACKGROUND

In a wireless communication system, a base station communicates with multiple mobile users. Wireless communications may include low delay data communications, such as voice or video transmissions, or high data rate communications, such as packetized data transmissions. U.S. patent application Ser. No. 08/963,386, entitled "METHOD AND APPARATUS FOR HIGH RATE PACKET DATA TRANSMISSION," filed Nov. 3, 1997 describes high rate packet data transmissions, and hereby expressly incorporated by reference.

Packet data transmissions are not required to be low latency transmissions, and therefore allow the base station flexibility in scheduling mobile user transmissions within a system. Once scheduled, the base station may transmit data to as little as a single mobile user during a given time period. In general, scheduling of packet data mobile users in a system has two goals. The first goal is to optimize the utilization of each channel. The second goal is to allocate transmissions to mobile users fairly. The two goals sometimes compete. For example, channel quality conditions and the amount of pending data for a given user may result in excessive time allocations to that user particularly at the expense of other users.

There is a need, therefore, for a fair method for scheduling packet data transmissions to mobile users that is channel-sensitive.

SUMMARY

The disclosed embodiments provide a novel and improved method for scheduling packet data transmissions in a wireless communication system. In one aspect, in a wireless communication system adapted for packet data transmissions, a method includes receiving rate request indicators for a plurality of mobile stations, calculating priority function values for the plurality of mobile stations in response to the rate request indicators, and scheduling transmissions to the mobile stations according to the priority function value.

According to another aspect, a wireless apparatus includes a priority factor calculation unit adapted to receive data rate requests from mobile stations and generate power factor values in response, and a scheduling unit coupled to the priority factor calculation unit, the scheduling unit adapted to schedule data transmissions.

According to still another aspect, a method for scheduling packet data transactions in a wireless communication system includes determining a pool of users, calculating a priority function of at least a portion of the pool of users, scheduling a first set of users having pending data transactions from the portion of the pool of users, receiving rate request indicators from the portion of the pool of users, and updating priority functions of the first set of users in response to the rate request indicators.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION OF THE PREFERRED EMBODIMENTS

In an exemplary embodiment of the present invention, a base station of a spread-spectrum wireless communication system schedules packet data transmissions to mobile users based upon the instantaneous values of a per-user Priority Function (PF). The user scheduling priority is related to the PF value, wherein a high PF value indicates a high scheduling priority and a low PF value indicates a low priority. In one aspect, a method for determining PF values is based on a channel condition indicated by a Rate Request Indicator (RRI). The method also considers a fairness criteria dictated by the Quality Of Service (QOS) requirements. Such a method provides robust protection against non-zero buffer under-runs on the transmitter side. In one embodiment, the rate request indicator is a Data Rate Request (DRR). In another embodiment, the rate request indicator is Carrier-to-Interference (C/I) information. Alternate embodiments may implement other types of rate request indicators or predictors. In the exemplary embodiment, the base station calculates a Priority Function (PF) for the multiple mobile users. Each PF is a function of the rate request indicator and the projected throughput of a given mobile user. The PF values allow the base station to schedule active mobile units having pending data. The scheduling produces an approximately equal share of the allocated transmission time to the multiple mobile stations.

Scheduling allocation improves channel sensitivity by reducing adverse effects associated with assigned data rates. Actual data rate assignments provide quantized transmission rates. This results in a coarse adjustment of data rates within a system. Actual data rates may be truncated, or otherwise manipulated, to conform to the assigned and available data rates. By using a rate request indicator to determine a transmission data rate, the data rate is adjusted according to the actual requirements and operating environment of the system.

Figure 1:
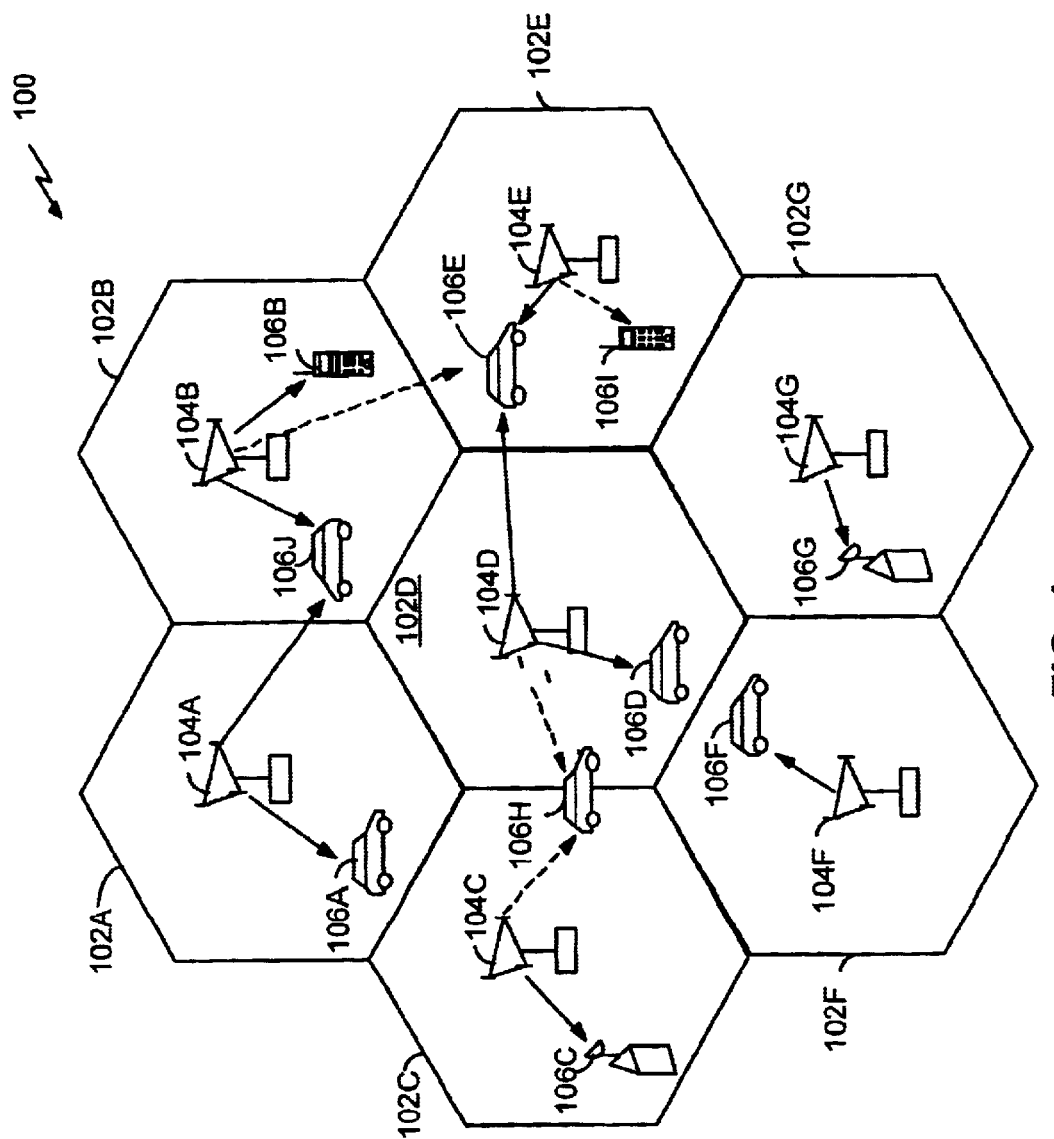
FIG. 1 illustrates in block diagram form a wireless communication system according to one embodiment.

FIG. 1 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 1 is consistent with a CDMA type system having HDR service.

Figure 2A:
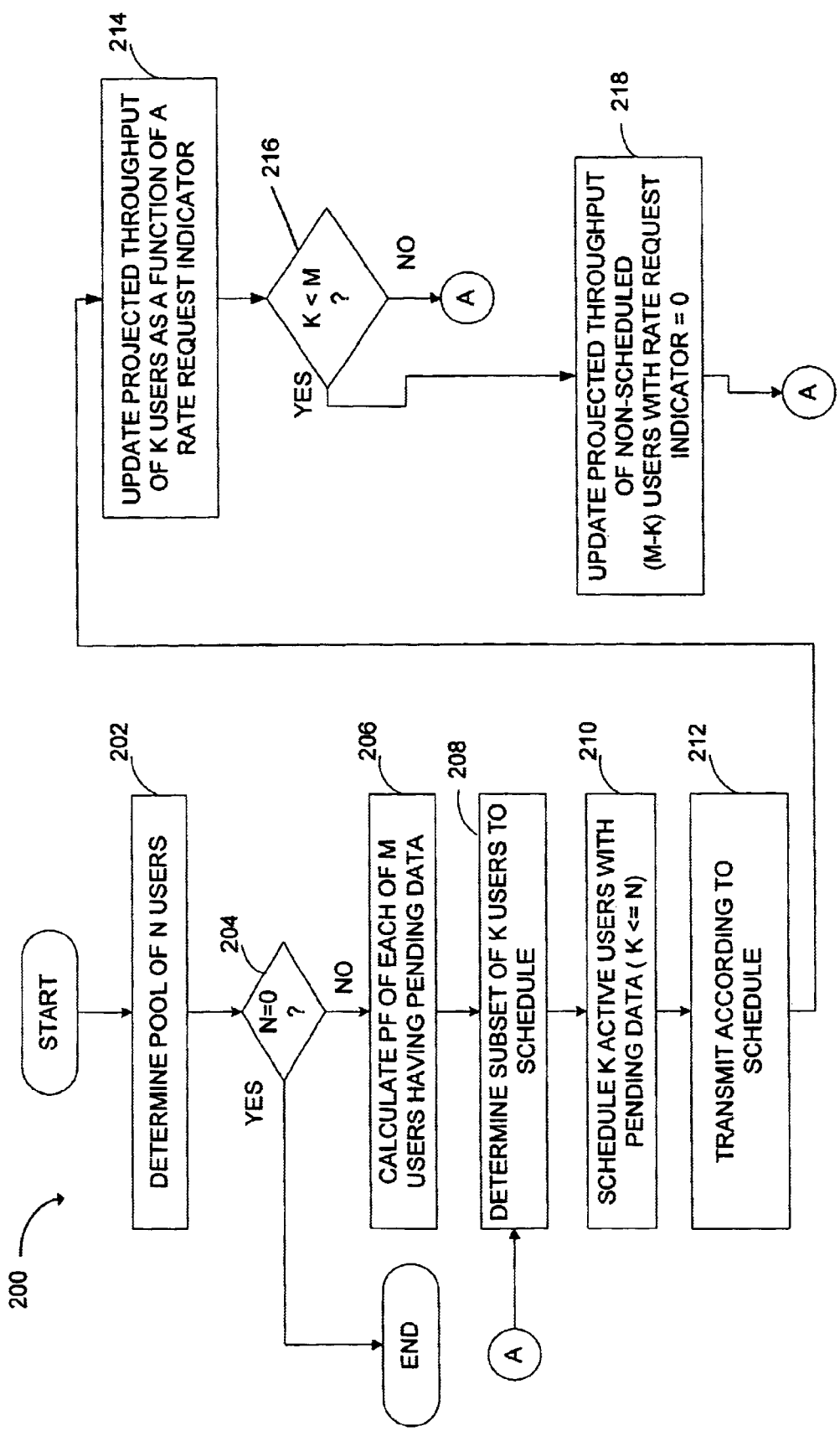
FIGS. 2A and 2B illustrate in flow diagram form a method for scheduling packet data transmission in a system as in FIG. 1 according to one embodiment.
Figure 2B:
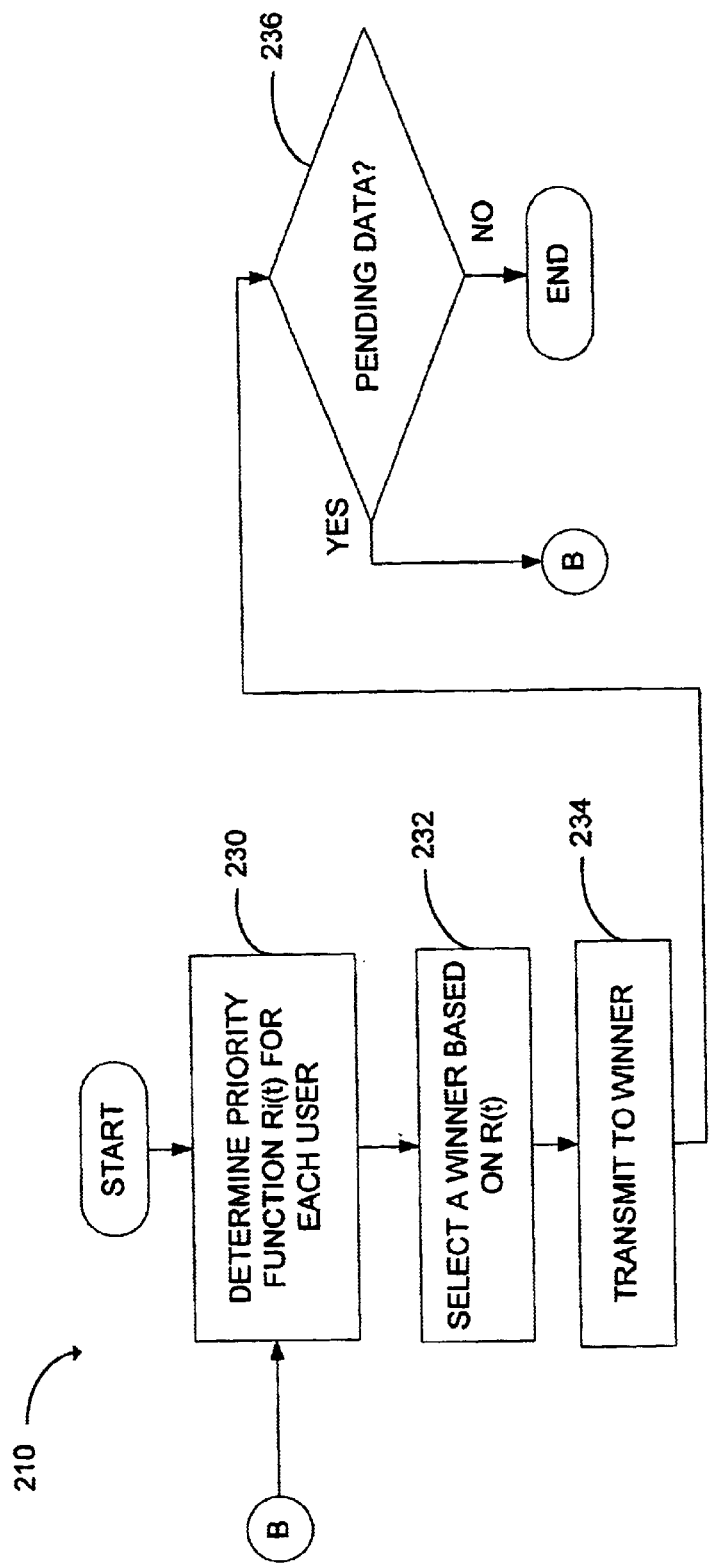

FIG. 2A illustrates a method 200 for scheduling mobile stations within system 100. The process begins by determining a pool of active mobile users within system 100 at step 202. The total number of mobile stations, or users, in the pool is designated as "N." If N is equal to 0, at step 204, the process ends, else the process continues to step 206 to calculate a PF for each of a subset of "M" users within the pool, wherein the M active users have data pending. The PF calculation is performed according to the following equation:

$$PF(j) = \frac{DRR(j)}{T'(j)}, \text{ for } j = 1, \ldots, M, \qquad (1)$$

wherein j is a user index corresponding to the M active users with pending data. In the exemplary embodiment, a rate request indicator is implemented as DRR(j), the Data Rate Request (DRR) received from user j, for j=1, ..., M. Having the channel-sensitive rate request indicator in the numerator provides proportionality to the scheduling of users in system 100. The rate request indicator is then divided by a projected throughput associated with each user j, T'(j). The actual throughput of each user, j, may be represented as T(j), although the actual throughput is not used directly in this calculation of Equation (1).

From the subset of M active users with data pending, at step 208, a further subset is determined of "K" users to be scheduled for transmission. In the exemplary embodiment, the subset of K users is determined according to system configuration and a predetermined scheduling policy. Often K=1, or K is constrained to a single user. However, K may be any number less than or equal to M. Based on the calculated PF values, the base station schedules "K" users at step 210. Note that the K scheduled users constitute a subset of the N active users, i.e., (K≤M≤N). The base station then transmits packet data transmissions at step 212 according to the schedule of step 210. Transmission involves determination of transmission power, power control, data rate, modulation, and other parameters of transmission. Note that concurrently, the base station may be transmitting low latency transmissions to mobile stations.

At step 214, the base station updates each projected throughput, T', for each of the K scheduled users as a function of a corresponding rate request indicator received from each scheduled user. The following formula describes the T' update calculation for scheduled users according to the exemplary embodiment:

$$T'(j,n+1) = (1-\alpha) \cdot T'(j,n) + \alpha \cdot DRR(j), \qquad (2)$$

wherein α is a time constant of a smoothing filter used for scheduling, for digital samples having index n. In one embodiment, the time constant may be related to the targeted QOS and/or velocity of each mobile station. In the exemplary embodiment, a rate request indicator is implemented as DRR(l), the Data Rate Request (DRR) received from user l, for l=1, ..., N. Having the channel-sensitive rate request indicator in the numerator provides proportionality to the scheduling of users in system 100. The rate request indicator is then divided by a projected throughput associated with each user j, T'(j). The actual throughput of each user, j, may be represented as T(j), although the actual throughput is not used directly in this calculation of Equation (1). Rather, the scheduling method makes a prediction or projection of the throughput of each user based on the rate request indicator received from that user. The rate request indicator may be the DRR transmitted via a Data Rate Control (DRC) channel, wherein the user determines a quality of the transmission channel and determines a corresponding data rate to request. The quality of the transmission channel may be a C/I measure of transmissions received by the user, wherein a corresponding DRR is associated with the C/I ratio, such as via a lookup table. In one embodiment, the user sends the C/I ratio to the base station and the base station determines a data rate based on the C/I. Alternately, the user may determine the data rate to request based on errors in transmitted data received by the user. The user may use a variety of methods to determine a data rate to request of the base station. Similarly, the user may implement a variety of rate request indicators for requesting a data rate from the base station. Still further, in one embodiment, different mobile stations implement different rate request indicators.

If K<M at step 216 processing continues to step 218 to update each T' for non-scheduled users within the pool of N active users, i.e., users not included in the M scheduled users. The projected throughput calculation for non-scheduled users is given as:

$$T(i,n+1)=(1-\alpha)\cdot T(i,n), \quad (3)$$

for i=1, . . . , (M−K). Here the rate request indicator is assumed to be zero for calculation of the projected throughput used for updating each PF associated with non-scheduled users. Processing then returns to step 208 wherein the updated PF values are used to continue scheduling any users that still have pending data.

The exemplary embodiment updates the PF values for each user as if each mobile station always has sufficient amount of pending data, and that the rate requested by each mobile station is realizable. Therefore, the scheduling sequence generated by the PF computed as in Equations (1)–(3) is not sensitive to any unpredictable states of the transmission buffers as long as a buffer has at least one bit of data to send.

FIG. 2A details step 210 of FIG. 2A according to one embodiment to determine a schedule. At step 230 a priority function is determined for each user. In the illustrated embodiment, the priority function is the data rate of the user, Ri(t). At step 232 the BS selects a winner according to the priority function and transmits data at step 234. If data is still pending at step 236 processing returns to step 230, else processing ends for this time period.

Figure 3:
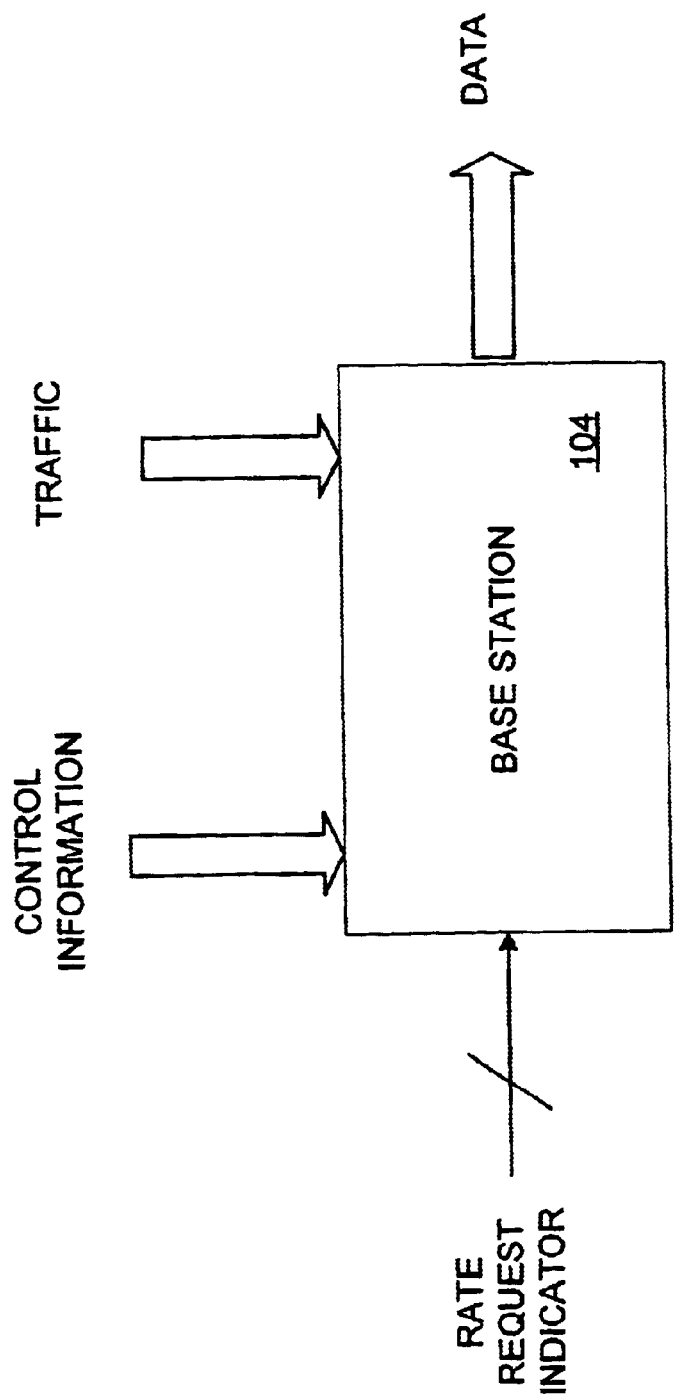
FIG. 3 illustrates in block diagram form a base station as in FIG. 1 according to one embodiment.

FIG. 3 further details base station 104, including signals received, processed, and transmitted. As illustrated, base station receives a rate request indicator, such as DRR or C/I, from multiple mobile stations. Control information is received from at least the mobile stations, and also may be received from a central controller, such as a Base Station Controller (BSC) (not shown). The base station receives traffic, referred to as "backbone traffic," from a network (not shown), such as the Internet. In response to these signals, base station transmits data to mobile stations.

Figure 4:
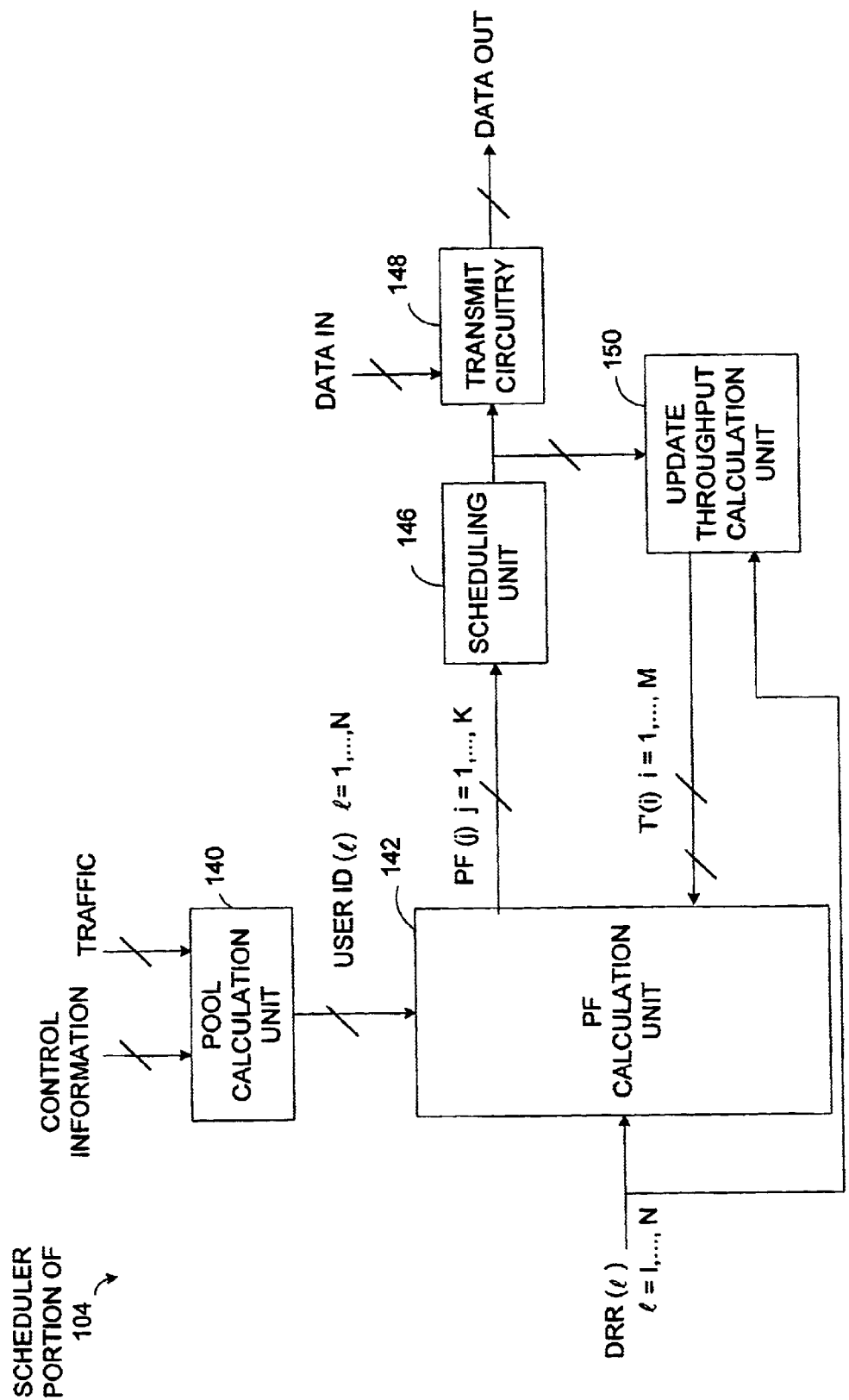
FIG. 4 illustrates in block diagram form a portion of a base station as in FIG. 3 according to one embodiment.

FIG. 4 further details a scheduler portion of base station. Base station includes a pool calculation unit 140 for determining the number and identification of mobile stations active at a given time. Active mobile stations communicate with base station, but may not have any pending data transactions. The pool calculation unit 140 receives control information from the mobile stations and the BSC (not shown), and also receives traffic from a network (not shown). In response, the pool calculation unit 140 provides user identification information, User ID(l) for l=1, . . . , N, to a PF calculation unit 142. The user identification information is provided for all N active users in system 100.

The PF calculation unit 142 receives data rate request indicators from the mobile stations, such as DRR(l). The PF calculation unit 142 uses the rate request indicator to determine a PF for each user according to Equation (1). The PF(j) for all users having pending data j=1, . . . , K are provided to a scheduling unit 146. The scheduling unit 146 determines a schedule among the various users associated with PF(j). The scheduling unit 146 provides the schedule information to transmit circuitry 148. DATA IN is also provided to transmit circuitry 148, which transmits the data according to the schedule information to produce DATA OUT. The schedule information is also provided to a calculation unit 150, which updates the projected throughput of the active N users. The scheduled users are updated according to Equation (2), while the non-scheduled users are updated according to Equation (3). For updating the projected throughput values, the calculation unit 150 receives rate request indicators for mobile stations. The updated projected throughput values for the subset of M users with pending data are then provided back to the PF calculation unit 142 to update the PF values. The calculation unit 150 includes a smoothing filter, such as an Infinite Impulse Response (IIR) filter. The tap coefficients for the smoothing filter are configurable.

In one example, a mobile station has a velocity of 3 km/hr and experiences a doppler frequency, $f_{doppler}$, of 5.4 Hz. Projected throughput(s) are subject to IIR smoothing filtering according to Equations (2) and (3) with a time constant, $T_W$, given as approximately, is 2 sec. The IIR filter tap coefficient, $\alpha$, is related to time constant $T_W$ by a relation given as:

$$\alpha = \frac{1}{T_W \cdot \left(\frac{\text{frames}}{\text{sec.}}\right)}, \quad (4)$$

resulting in a time constant of 1/100 given a frame duration of 20 msec, i.e., 50 frames/sec. In general calculation of a involves first determining a quality of service for the transmissions reflecting a fairness constraint wherein each mobile station is allocated a time fraction within a predetermined tolerance. The calculation then optimizes $\alpha$ to achieve optimum real system throughput.

In an alternate embodiment, the proportional fair algorithm implements a fairness criteria that incorporates a delay term. Specifically, the delay is measured at the base station, from the time a data packet arrives until the data is transmitted from the BS to a user or MS. The delay may be measured until the start of the transmission or the end of the transmission. The delay effectively measures the time data is maintained at the BS before transmission. The data may be stored in a queue or other memory storage device at the BS 12 (not shown).

Generally, the proportional fair algorithm maintains a balance between maximizing throughput among a set of users and fairly allocating throughputs to individual users. The algorithm does not, however, guarantee satisfaction of a specific delay requirement for an individual user. By modifying the proportional fair priority function, PF, to include a delay sensitive term the result provides scheduling consistent with the delay requirement(s). Note that the delay requirements are typically specified by an operating standard.

In an exemplary embodiment, the delay requirements of the users in the system are provided as a function of time (e.g. d given in seconds) to BS 104 a priori. The BS then assigns a time delay threshold value, τ, to each user. Specifically, the BS 104 stores the values $\tau_i$ for users i=1, ... N, wherein N is the total number of users at a given time. Calculating the traditional proportional fair priority of a user is given as:

$$\frac{DRC}{T} \quad (5)$$

wherein DRC is the data rate sustainable by a given MS, and T is the throughput of the user. By modifying Equ. (5) to:

$$\frac{DRC}{T}g(d) \quad (6)$$

the PF calculation incorporates a delay function g(d) which is a function of the user's delay.

In this way, the scheduling method gives priority to a user when his delay is above a predetermined threshold value by application of Equ. (6). When the delay is reduced below the threshold value, the user's priority is calculated as in Equ. (5).

Figure 5:
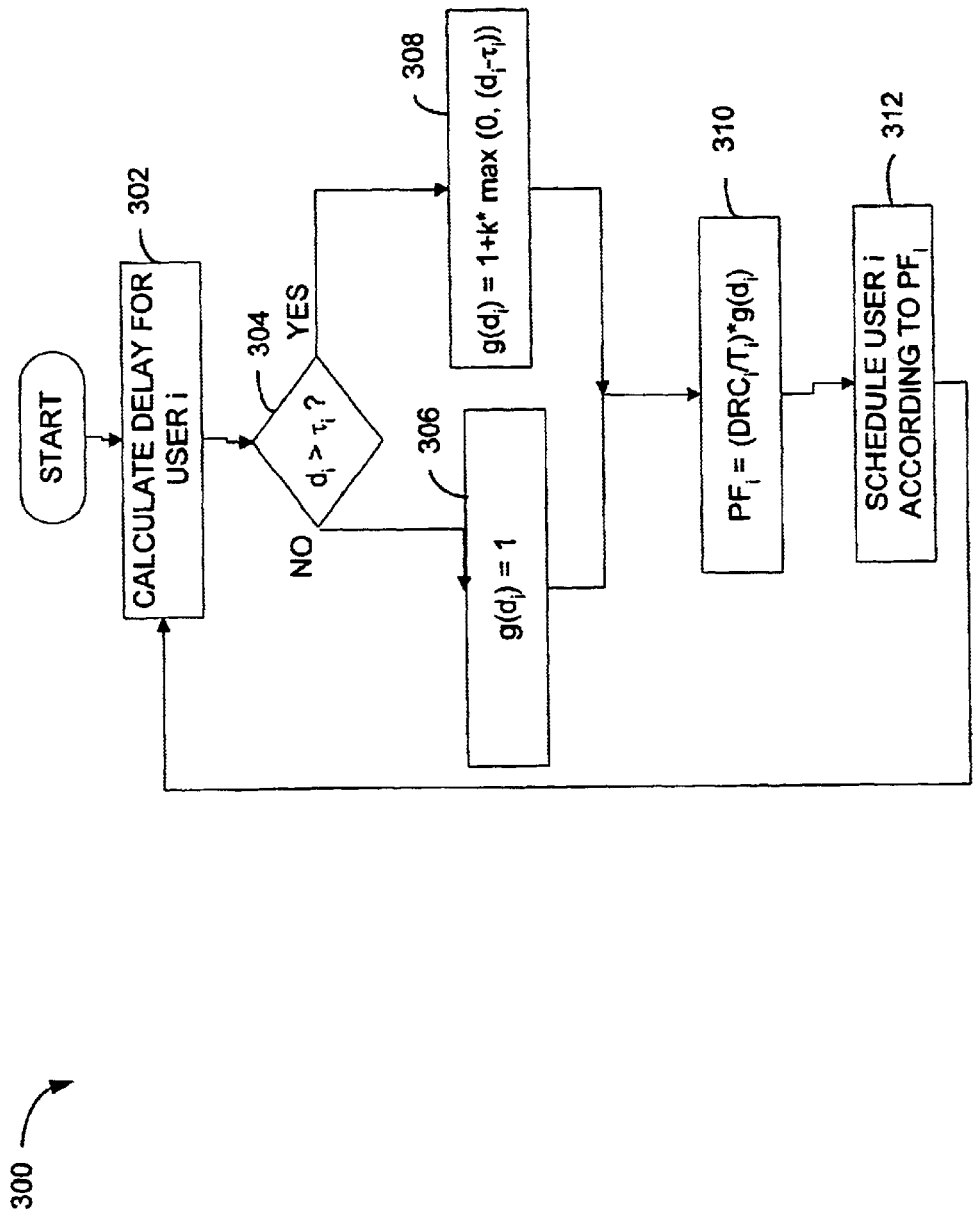
FIG. 5 is a flow diagram for scheduling data transmissions.

FIG. 5 illustrates a method 300 of scheduling users in a packetized data transmission system. The process calculates the delay for a user i, specified as $d_i$ at step 302. The delay $d_i$ is then compared to a threshold $\tau_i$. The threshold $\tau_i$ is specific the user i. Alternate embodiments may implement a single threshold for all users. Additionally, the threshold $\tau_i$ may be a dynamic threshold that is updated during operation of the system. If the user delay is greater than the threshold at decision diamond 304, the process calculates a delay function g(d) for di at step 306, wherein the function is defined as:

$$g(d_i)=1+k^*MAX(0,(d_i-\tau_i)). \quad (7)$$

If the user delay is less than or equal to the threshold, the delay function g(d) is calculated at step 308 and is given as:

$$g(d_i)=1. \quad (8)$$

The process then applies a PF at step 110 using the delay function calculated in step 306 or 308. The PF is given as:

$$PF_i=(DRC_i/T_i)^*g(d_i). \quad (9)$$

Alternate embodiments may implement any of a variety of delay functions consistent with the requirements, performance, and extent of a given communication system. In an alternate embodiment, the delay function is defined as:

$$g(d_i)=1+k^*MAX(0,f(d_i-\tau_i)), \quad (10)$$

wherein $f(\ )$ may represent an increasing function of the delay, or specifically, an increasing function of $(d_i-\tau_i)$.

Another alternate embodiment implements the delay function as defined by the following equations:

$$g(d_i)=1, \text{ for } d_i<\tau_i; \text{ and} \quad (11)$$

$$g(d_i)=DRC_{MAX}/DRC_{AVE}, \text{ for } d_i\geq\tau_i, \quad (12)$$

wherein $DRC_{MAX}$ is a maximum value of the DRCs for all users, and $DRC_{AVE}$ is an average value for the DRC of user i. The delay function of Equations (11) and (12) adjusts the PF of a given user as a function of the delay of that user with respect to the other users. Therefore, if the average requested data rate, i.e., DRC, of user i is substantially less than the maximum DRC over all users in the active set having pending data and if the user is experiencing a delay violating the threshold, the user i will receive a priority bump up.

In still another embodiment. The PF of Equ. (5) is modified to adjust priority as a function of throughput instead of delay, wherein the PF is calculated as:

$$\frac{DRC}{T}g(T_i) \quad (13)$$

incorporating a throughput function $g(T_i)$. The throughput function reflects the throughput of user i. Specifically, if the throughput $T_i$ is greater than a throughput threshold, then $$g(T_i)=1; \text{ and} \quad (14)$$

if the throughput $T_i$ is less than or equal to the throughput threshold, then $$g(T_i)=DRC_{MAX}/DRC_{AVE}. \quad (15)$$

In this way, the user priority is modified in response to throughput received. When the throughput is too low, i.e., at or below the threshold, the PF is bumped up. Else, the priority function is calculated as given in Equ. (5). Therefore, if the average requested data rate, i.e., DRC, of user i is substantially less than the maximum DRC over all users in the active set having pending data and if the user is experiencing a throughput violating the throughput threshold, the user i will receive a priority bump up.

Further, alternate embodiments may implement a variety of delay functions, such as those specified in "Providing Quality of Service over a Shared Wireless Link" by Matthew Andrews, et al., IEEE Communications Magazine, February 2001, pp. 150–154, which is hereby expressly incorporated by reference.

Figure 6:
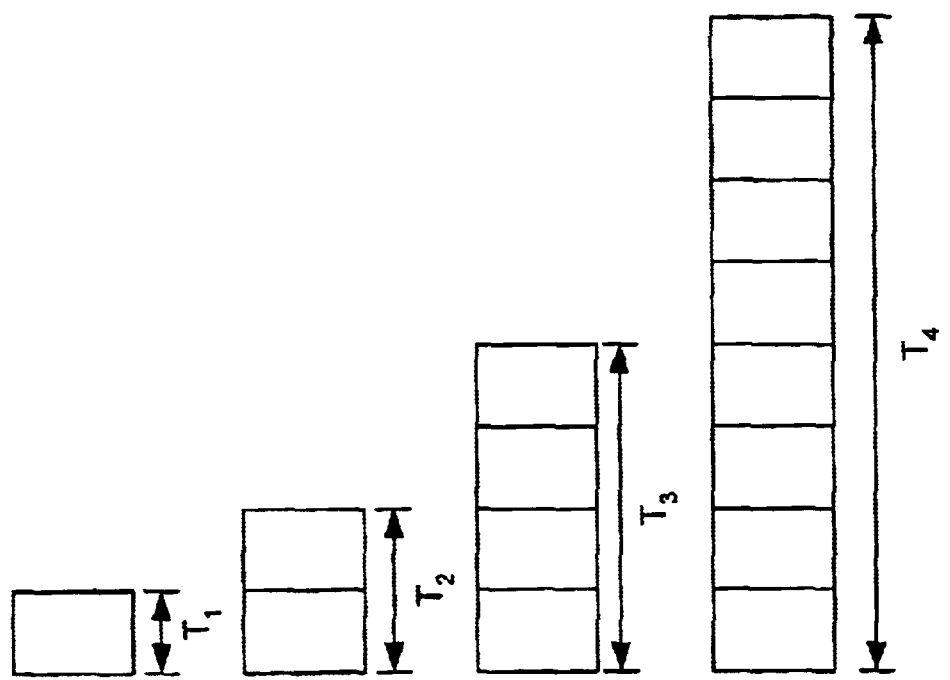
FIG. 6 illustrates data transmissions in a wireless communication system.

An exemplary embodiment provides an alternate method for calculating the Priority Function (PF) using a proportional fair scheduling algorithm applied to a data transmission system. The present exemplary embodiment is discussed with respect to a IS-2000 1xEVDV system. The present invention is applicable, however, to any wireless communication system employing a scheduler. The exemplary embodiment is an HDR type system, wherein an ARQ scheme is applied to provide retransmissions of a data packet and/or sub-packet. The data transmissions are provided as packets of data. Each data packet may be transmitted over a fixed or variable number of time intervals referred to as slots. In the exemplary embodiment, a slot is defined as the minimum time interval during which a data packet or a portion of a data packet, referred to as a sub-packet, may be transmitted. For example, in one embodiment a slot is 1.25 msec. In one embodiment, multiple slots may be used for transmission of data packets or sub-packets. FIG. 6 illustrates data transmissions available in the exemplary embodiment. As illustrated, each data transmission may have a variable length, including one, two, four, or eight slot lengths. Note that in such a system, a data packet may be transmitted in one of the formats illustrated in FIG. 6. For a one slot transmission length, the time interval is given as $T_1$. For a two slot transmission length, the time interval for the transmission is given as $T_2$, wherein:

$$T_2=2^*T_1. \quad (16)$$

Similarly, a four slot transmission length is equal to four $T_1$ time intervals, and an eight slot transmission length is equal to eight $T_1$ intervals. Alternate embodiments may imply any number of slots to a transmission interval. Still other embodiments may apply a fixed time interval for a data transmission.

Figure 7A:
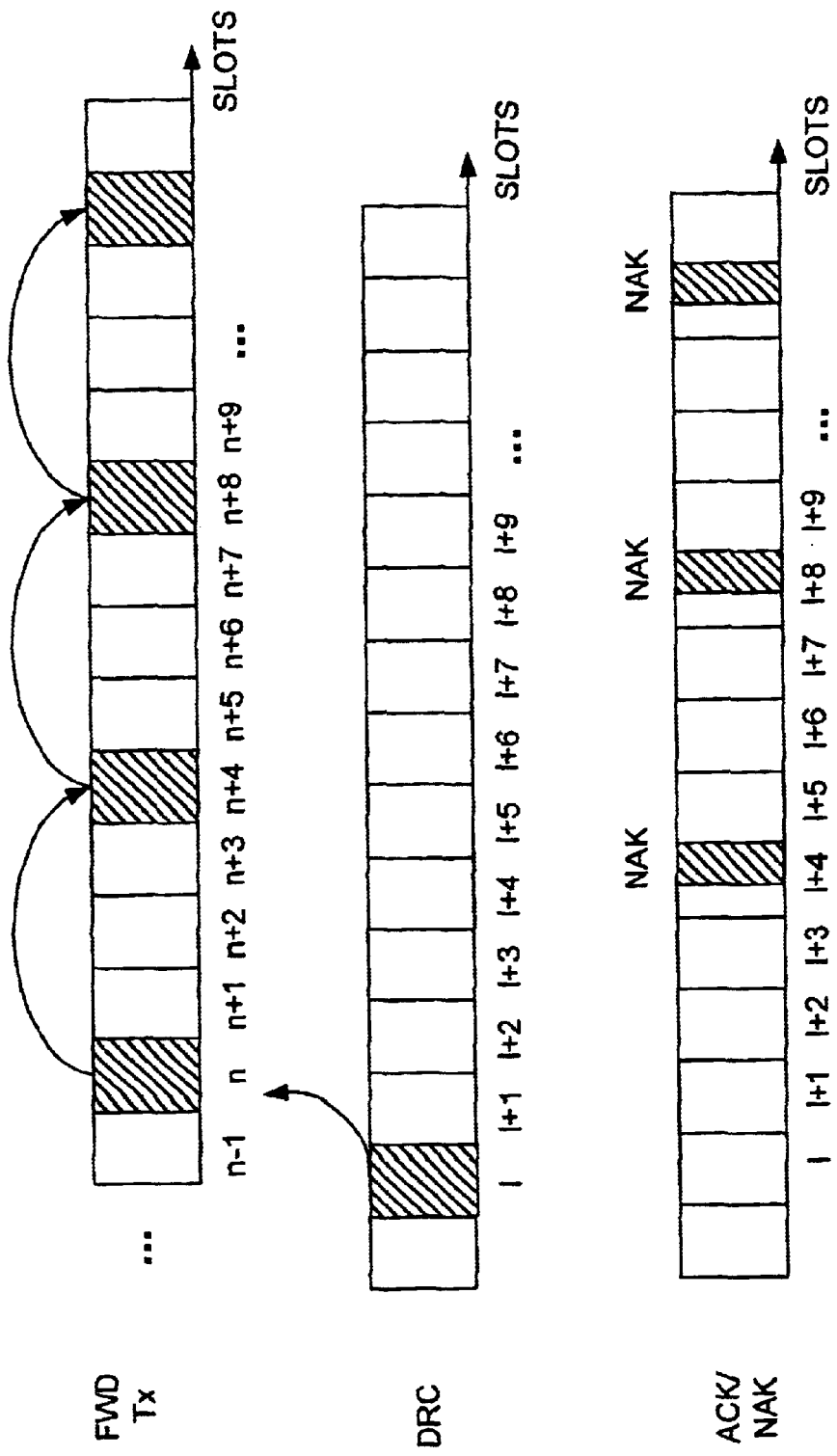
FIGS. 7A and 7B illustrate automatic repeat requests in a data transmission.

The data is typically transmitted on a sub-packet basis as illustrated in FIG. 7A, wherein a forward link data multiple slot packet transmission is illustrated along with the reverse link signaling. For a given data packet, the receiver first specifies a requested date rate or DRR, for example, a Data Request Control (DRC) indicator. The receiver analyzes the channel condition for the transmission, and in response, specifies the data rate at which the receiver is able to receive data transmissions. The transmitter receives the DRR, or some other channel condition indicator, and transmits the data packet accordingly.

The exemplary embodiment supports an ARQ scheme supporting retransmission of a data packet, wherein the receiver provides a feedback signal to the transmitter indicating whether the data packet was received or not. Specifically, the receiver sends an ACK signal to acknowledge that sufficient information was received to decode the data packet; or in contrast, the receiver sends a NAK signal to indicate that the data packet has not yet been received. In response to the NAK signal, the transmitter retransmits the data packet. In response to the ACK signal the transmitter terminates transmission of the data packet. The data packet may be transmitted over one, two, four or eight slots as illustrated in FIG. 6. Note that after transmission of a data packet and prior to receipt at the transmitter of the NAK signal, the transmitter may transmit other data packet(s), wherein the other data packet(s) may be directed to a same receiver or another receiver.

Figure 7B:
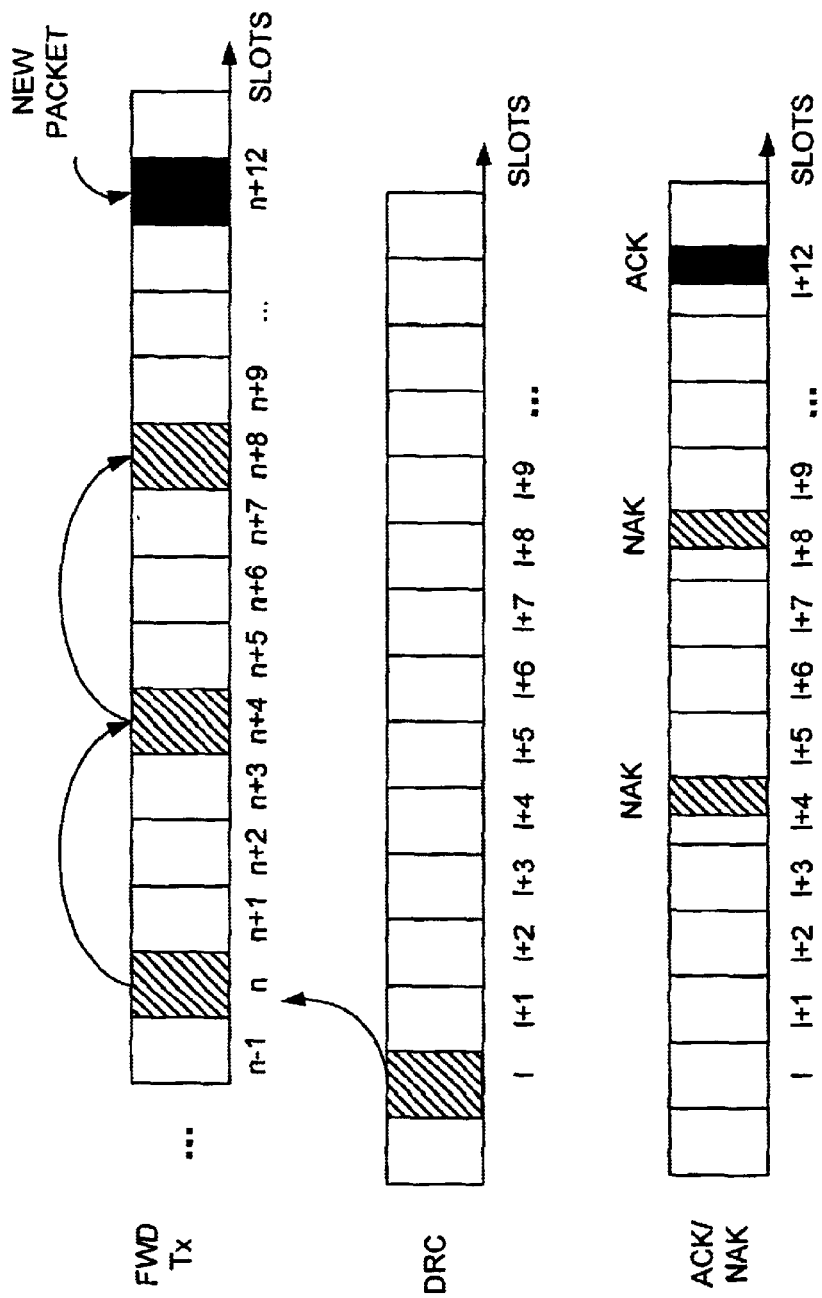

As illustrated in FIGS. 7A and 7B, in a system supporting an ARQ scheme, each transmission may need multiple retransmissions. The retransmissions are ended either when an Acknowledge (ACK) signal is received, or when the transmission reaches a maximum number of retransmissions. The maximum number of retransmissions may be a predetermined value for the system or may be negotiated between the transmitter and receiver.

An example of transmission(s) and retransmission(s) in the exemplary embodiment is specifically illustrated in FIGS. 7A and 7B, wherein the reverse link DRC and ACK/NAK signals from the receiver are illustrated with respect to the forward link transmission slots. The DRC is transmitted by a mobile station at slot l, wherein the mobile station has pending data and instructs the transmitter of the data rate at which the mobile station is able to receive the transmission. In response to receipt of the DRC (indicated by the connective arrow), the transmitter sends the first portion of the data packet in slot n. Note that the slot boundaries on the FL and RL are not necessarily coordinated in time. The transmitter then sends other information during slots n+1, n+2, and n+3, such as portions of other data packets. The transmitter sends the second portion of the data packet (associated with the DRC illustrated) during slot n+4. Further portions of the data packet are then sent periodically until the mobile station (receiver) indicates that the data packet has been properly received, i.e. transmits an ACK signal. Note that the mobile station transmits a NAK signal to indicate that the data packet has not been received, or that sufficient information has not been received to decode the data packet. In response to each NAK signal the transmitter sends another portion of the data packet. For example, as illustrated, a NAK is sent at slot l+4, and in response a data portion is sent at slot n+4.

FIG. 7B illustrates application of an ACK to allow the transmitter to terminate transmission of the data packet. As illustrated at slot l+12 the mobile station transmits an ACK indication. The transmitter terminates the data packet transmission, and initiates a new data packet at slot n+12.

Further, the exemplary embodiment supports Time Division Multiplex (TDM) transmission(s), wherein the transmitter transmits to one receiver during a given time interval. The TDM transmission uses all of the transmit energy to transmit data to a selected receiver. The exemplary embodiment also supports Code Division Multiplex (CDM) transmission(s), wherein the transmitter transmits to multiple receivers during a given time interval. The multiple receivers are separated by application of a spreading code. The transmission energy is divided among the multiple receivers. A scheduling method, referred to as a scheduler, is used to determine the order of transmissions. For each time interval, the scheduler selects a winner based on predetermined criteria, such as, but not limited to, channel condition, amount of pending data, history of transmissions, throughput of user, etc.

To schedule transmissions, each user or mobile station is assigned a priority index, or PF, that is directly proportional to the mobile station C/I. The priority index is as defined hereinabove in Equ. (1), wherein the priority index or PF is inversely proportional to the average user throughput. The scheduler seeks to equalize the transmission time and transmission energy allocated to the receivers. Generally, large gains are experienced for low-velocity mobile units, as the C/I is predicted with a high degree of accuracy. In other words, as the channel condition of the slow moving vehicle changes slowly, the scheduler is better able to track the channel condition. Therefore, few, if any, retransmissions may be needed to receive the data packet(s). Conversely, for higher-velocity mobile units, the channel condition changes more quickly, and the scheduler is less able to track the channel condition. Fast moving receivers tend to require retransmissions to receive the data packet(s).

The proportional-fair algorithm basically prioritizes users according to a given metric. The exemplary embodiment uses a scheduler on the forward link (or down link) to schedule data transmission to multiple data users. Schedulers such as proportional-fair scheduler use C/I (or DRR) feedback information and user throughput information to select the best user for a next transmission. As described hereinabove, a cost function applying the ratio of C/I (or DRR) and user throughput is used to calculate the priority index for each user. The user with the highest priority index will be selected for a next transmission. Such a cost function takes advantage of the channel condition to maximize system performance, as well as to maintain fairness for each end user.

Users in the system will be served for a statistically equal time (i.e., will have the same mean service time), wherein each user is served for an equal time interval on each turn. The scheduling is done in response to receiving channel condition information from the mobile stations. The transmission of C/I or DRC information from the mobile stations introduces a delay into the calculation. The delayed C/I information may in return introduce significant estimation errors, for example, as a channel fades quickly the current information received at the transmitter may already be inconsistent with the changed condition of the channel. As discussed hereinabove, fast moving receivers tend to require more retransmissions, and thus receive more time allocations. The difference between slow moving and fast moving receivers detracts from the balancing promoted by the fair-proportional algorithm.

Application of the proportional-fair algorithm to a wireless system employing an ARQ scheme, wherein multiple sub-packets may be transmitted, the throughput is updated at the beginning of the first sub-packet transmission. The fairness is maintained when all users have the same average error rate or the same channel conditions. However, when one user has a slow fading channel and the other user has a fast fading channel, the user with fast fading channel may desire more retransmissions than the user of the slow fading channel. Therefore, the fairness of statistically equal access time may not be maintained if the user throughput (and therefore the priority index function) is updated only once at the beginning of the first sub-packet transmission. In other words, as channel condition may change between transmission of the channel condition indicator, e.g. C/I or DRC from the mobile station, and completion of the data transmission, i.e., transmission of the last sub-packet, the scheduler may not be using current information in making scheduling decisions.

In the exemplary embodiment, user throughputs are updated, and the corresponding PFs generated, at each slot of a transmission and a retransmission. The throughput value is updated as a function of the throughput history and the DRC or payload value. In one embodiment, Equs. (2) and (3) are combined and the throughput is updated according to:

$$T(i)=\alpha T(i-1)+(1-\alpha)[DRC]. \qquad (17)$$

Alternate embodiments may include additional throughput history terms, e.g. T(i−2), or other factors that contribute to a more accurate scheduling scheme. The updating of the throughput occurs on each transmission of a sub-packet and on retransmission of a sub-packet. In other words, the throughput is updated at each slot. As described hereinabove, the transmission and retransmission of a first data packet (or portions of a same data packet) may be interleaved with other data packet(s) (or portions of other data packet(s)). The other data packets may be directed to other receivers, wherein when the throughput of the first data packet is updated on slots for other receivers, the DRC of the first packet is set to zero. In this case, the second term in Equ. (17) is set to zero. Refer also to Equs. (2) and (3) given hereinabove.

When a sub-packet is transmitted over multiple slots, the payload for each slot may be generated as the total payload of the packet divided by number of slots in this sub-packet. For example, for a multiple slot transmission, the payload may be divided by the total number of slots per transmission, wherein the quotient defines the size of the sub-packet per slot. This is particularly advantageous in a CDM system. In an alternate embodiment, the multiple slot transmission places the payload of the packet into the first slot of the transmission and fills the other slots in the transmission with zeroes. Still other embodiments may employ some other method of distributing the payload over multiple slots for a multiple slot transmission. The payload is added to the throughput on a slot by slot basis at each update.

Alternatively, a scale factor may be added to the payload calculation for the updates of each retransmission sub-packets. The scale factor is used to adjust and trade-off between fairness and throughput performance. Alternate embodiments may apply other schemes for balancing the energy allocated to the various users within a system.

When multiple users share the same time interval in a CDM fashion, the user with the highest priority index will be given priority to allocate needed power. The remaining power will be allocated to lower priority users one by one based on their priority index until the remaining power is not sufficient to support any additional user. At the time of transmission, the proportional-fair algorithm typically updates the throughput for all users that have transmitted data during this time interval. The throughput update may reduce a user's priority index, and thus may reduce the chance for lower priority users to transmit at a good channel condition. According to the exemplary embodiment, at each time interval, the system updates the throughput for the highest priority user as a function of the throughput history and the DRC, such as according to Equ. (17). In this way, the recent data transmission is considered in calculating the throughput, thus increasing the throughput value. The increased throughput results in a reduced PF value (as the throughput is in the denominator of the PF definition). Note that the highest priority user may be defined as having the highest PF value. The throughput(s) of the other CDM user(s) are updated as a function of throughput history only. For example, Equ. (17) may be reduced to:

$$T(i)=\alpha T(i-1). \qquad (18)$$

In this way, the recent data transmission is not considered in calculation of throughput for the other receivers, thus reducing the throughput. The reduced throughput results in an increased PF. Therefore, the remaining CDM receivers are given a bias in the next selection for transmission. Alternatively, the remaining CDM users may update their throughput and priority index using a scale factor, wherein the scale factor is used to adjust and trade-off between fairness and throughput performance.

Figure 8:
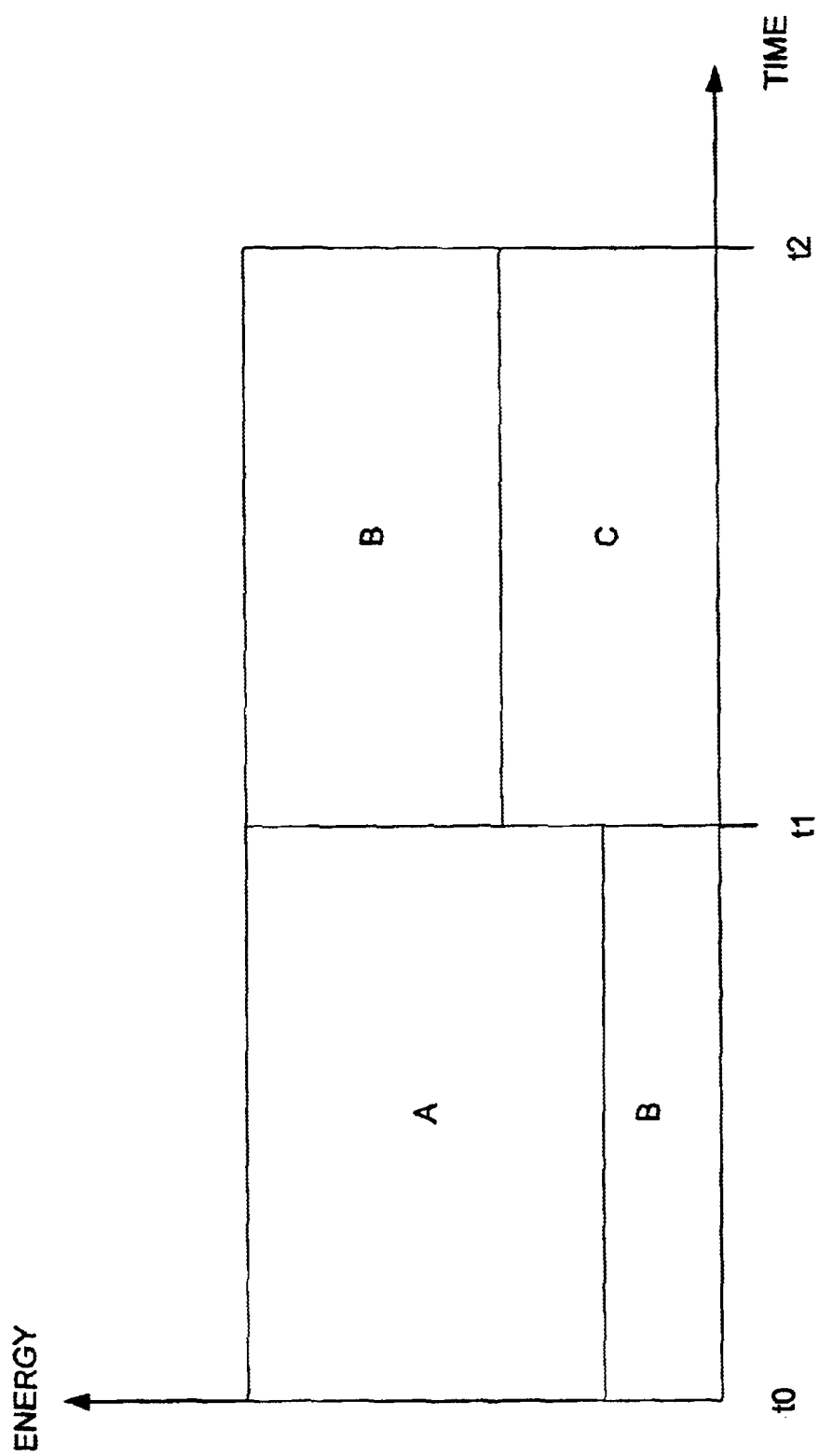
FIG. 8 is an energy plot of data transmissions.

FIG. 8 illustrates the energy plot and allocation for transmission of data packets to multiple receivers. The receivers having pending data include receivers identified as A, B, and C. Other receivers not illustrated may also be considered. During a first time interval from time t0 to t1, the receiver A has the highest PF. In addition to receiver A, the transmitter has sufficient energy to support receiver B. At the end of the time interval, at time t1, the throughput of receiver A is updated as a function of throughput history and DRC, such as by application of Equ. (17), while receiver B is updated as a function of throughput history alone, such as by application of Equ. (18). As a result of the updated values, receiver B has the highest PF and is scheduled for transmission during a second time interval from time t1 to time t2. Additionally, receiver C is scheduled for transmission during the second time interval and receiver A is not scheduled. Alternate embodiments may provide other differentials to the updating of the threshold value, for example, by applying a scaling factor to each of the receivers selected for transmission during a given time interval.

Figure 9:
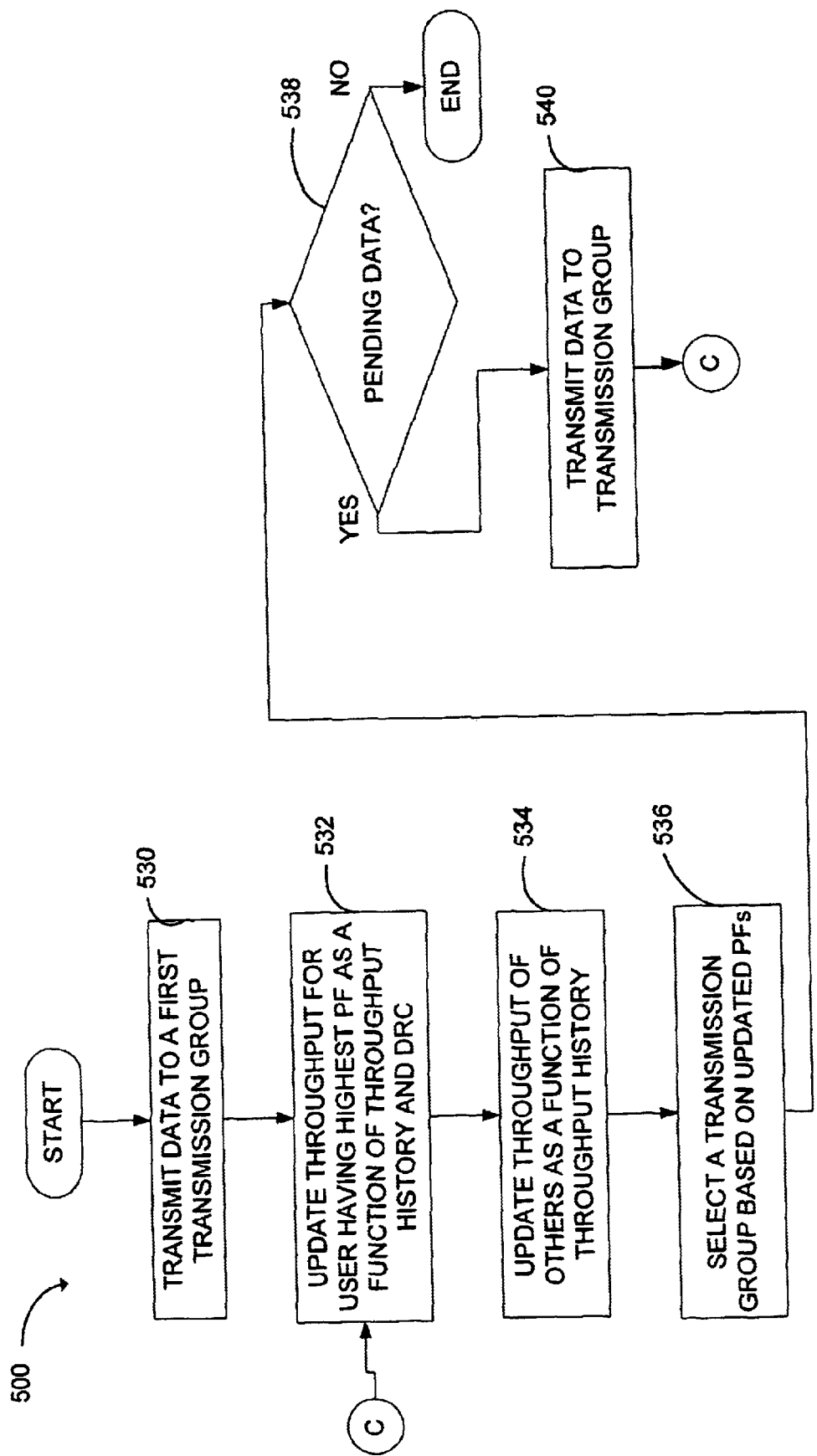
FIG. 9 is a method for updating a throughput parameter in a data transmission.

FIG. 9 illustrates a method 500 for updating throughput and PF information in a spread-spectrum wireless communication system. At step 530 the transmitter transmits data packets to a transmission group, such as illustrated in FIG. 8. The transmission group is determined by the available transmission resources and the PF values of each receiver in the system having pending data. The receivers are selected according to PF value, starting with the highest PF value, and continuing to schedule receivers until no further receivers may be supported. The transmitter transmits to each of the CDM receivers during a same time interval. The PF may be calculated as described hereinabove, or the PF may be calculated using an alternate method that considers the performance criteria of the system and the transmission requirements of the communication participants. According to the exemplary embodiment, the calculation of PF considers the channel condition and throughput.

At step 532 the scheduler updates the throughput value for the receiver having the highest PF from the last time interval. The updating considers both the throughput history of the receiver and the DRC. At step 534 the scheduler updates the throughput of the other receiver(s) as a function of the throughput history and without considering the DRC. The PF values are then updated based on the updated throughput values. The PF values are then used to select a new transmission group at step 536. If there is pending data at decision diamond 538 the process transmits data to the transmission group at step 540 and returns to step 532. Else the process ends.

According to an alternate embodiment, the PFs for the other users are updated using a scaling factor. The scaling factor may be a function of the relative weight of a given PF with respect to the highest priority user's PF value. Alternately, the scaling factor may be a constant value for each of the other users. Still other alternatives may implement a scaling factor to achieve a desired result within a given system.

Thus, a novel and improved method and apparatus for scheduling packet data transmissions in a wireless communication system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Still another embodiment may implement a delay function, such as specified in "Downlink Scheduling in CDMA Data Networks" by Niranjan Joshi, et al., ACM Mobicom 2000 and which is hereby expressly incorporated by reference.

Often systems will provide a relatively large margin within which the system may achieve the desired system performance requirements. For example, the system performance requirements may be designed to handle worst case requirements, wherein actual operating points are well outside this condition. One embodiment foregoes the large margins, and takes advantage of the ARQ repetition of data. As the ARQ scheme repeats a transmission multiple times, the repetition information may be used to gradually and statically guess the minimum power needed to achieve the required system performance. In this way, the margin may be significantly reduced to more accurately model the operating conditions of the system.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software modules could reside in RAM memory, flash memory, ROM memory, EPROM memory, EEPROM memory, registers, hard disk, a removable disk, a CD-ROM, or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a wireless communication system adapted for packet data transmissions, the system having a plurality of mobile stations, a method comprising:

determining an original priority factor for each of the plurality of mobile stations;

scheduling transmissions to at least one of the plurality of mobile stations based on the original priority functions, wherein a first mobile station has a highest priority factor;

transmitting to the first mobile station;

determining an updated priority factor for the first mobile station; and scheduling transmissions to at least one of the plurality of mobile stations based on the updated priority factor for the first mobile station and the original priority functions of the other mobile stations.

2. The method as in claim 1, wherein determining the updated priority factor for the first mobile station, comprises:

determining an updated throughput value for the first mobile station; and calculating a priority function based on the updated throughput value.

3. The method as in claim 1, wherein the updated throughput value is calculated as:

$$T(i) = \alpha T(i-1) + (1-\alpha)[DRC],$$

wherein T is the throughput, a is a scale factor, and DRC is the payload of the transmitted information.

4. The method as in claim 3, further comprising:

determining an updated priority function for at least one other of the plurality of mobile stations, wherein the updated priority function is based on an updated throughput value given as:

$$T(i) = \alpha T(i-1).$$

5. The method as in claim 1, wherein scheduling transmissions applies a proportional-fair algorithm.

6. In a wireless communication system adapted for packet data transmissions, an infrastructure element comprising:
- means for determining an original priority factor for each of the plurality of mobile stations;
- means for scheduling transmissions to at least one of the plurality of mobile stations based on the original priority functions, wherein a first mobile station has a highest priority factor;
- means for transmitting to the first mobile station;
- means for determining an updated priority factor for the first mobile station; and
- means for scheduling transmissions to at least one of the plurality of mobile stations based on the updated priority factor for the first mobile station and the original priority functions of the other mobile stations.

7. In a wireless communication system adapted for packet data transmissions and supporting automatic retransmission of data packets, the system having a plurality of mobile stations, a method comprising:
- receiving a rate request indicator from a first mobile station;
- transmitting a first data packet to the first mobile station, the first mobile station having a throughput value;
- updating the throughput value of the first mobile station using the rate request indicator;
- receiving a negative acknowledge signal from the first mobile station; and
- in response to the negative acknowledge signal retransmitting the first data packet.

8. The method as in claim 7, further comprising:
scheduling transmissions as a function of throughput values of the plurality of mobile stations.

9. The method as in claim 8, wherein the data packets are transmitted over multiple transmission slots.

10. In a wireless communication system adapted for packet data transmissions and supporting automatic retransmission of data packets, the system having a plurality of mobile stations, an infrastructure element comprising:
- means for receiving a rate request indicator from a first mobile station;
- means for transmitting a first data packet to first mobile station, the first mobile station having a throughput value;
- means for updating the throughput value of the first mobile station using the rate request indicator;
- means for receiving a negative acknowledge signal from the first mobile station; and
- means for retransmitting the first data packet in response to the negative acknowledge signal.

11. In a wireless communication system adapted for packet data transmissions and supporting automatic retransmission of data packets, the system having a plurality of mobile stations, an infrastructure element storing a plurality of computer-readable instructions for performing:
- receiving a rate request indicator from a first mobile station;
- transmitting a first data packet to first mobile station, the first mobile station having a throughput value;
- updating the throughput value of the first mobile station using the rate request indicator;
- receiving a negative acknowledge signal from the first mobile station; and
- retransmitting the first data packet in response to the negative acknowledge signal.

* * * * *